United States Patent [19]
Bloom

[11] Patent Number: 5,695,861
[45] Date of Patent: Dec. 9, 1997

[54] SOLDER ACTIVE BRAZE

[75] Inventor: Terry R. Bloom, Middlebury, Ind.

[73] Assignee: CTS Corporation, Elkhart, Ind.

[21] Appl. No.: 544,677

[22] Filed: Oct. 18, 1995

[51] Int. Cl.$^6$ ........................................................ B32B 9/00
[52] U.S. Cl. .......................... 428/209; 428/210; 428/688; 428/689; 75/255; 75/328
[58] Field of Search ..................................... 428/209, 688, 428/689, 210; 75/255, 328

[56] References Cited

U.S. PATENT DOCUMENTS

| | | |
|---|---|---|
| 2,570,248 | 10/1951 | Kelley . |
| 2,668,923 | 2/1954 | Bondley . |
| 2,677,781 | 5/1954 | Drieschman . |
| 2,739,375 | 3/1956 | Coxe . |
| 2,805,944 | 9/1957 | Bender . |
| 2,874,341 | 2/1959 | Biondi et al. . |
| 3,001,269 | 9/1961 | Moore et al. . |
| 3,484,210 | 12/1969 | Pinter . |
| 3,665,592 | 5/1972 | Apospors . |
| 4,396,677 | 8/1983 | Intrater et al. . |
| 4,630,767 | 12/1986 | Mizuhara . |
| 4,643,875 | 2/1987 | Mizuhara . |
| 4,684,579 | 8/1987 | Mizuhara . |
| 4,729,504 | 3/1988 | Edamura . |
| 4,775,414 | 10/1988 | Shoji . |
| 4,797,328 | 1/1989 | Boehm et al. . |
| 4,835,344 | 5/1989 | Iyogi et al. . |
| 4,901,904 | 2/1990 | Tsuno . |
| 4,938,922 | 7/1990 | Mizuhara . |
| 5,013,612 | 5/1991 | Hunt et al. . |
| 5,019,187 | 5/1991 | Iyogi et al. . |
| 5,104,747 | 4/1992 | Makino et al. . |
| 5,198,265 | 3/1993 | Iacovangelo et al. . |

FOREIGN PATENT DOCUMENTS 2-15874  1/1990  Japan .

OTHER PUBLICATIONS

Terry R. Bloom, "An Aluminum Nitride Package For 300° C. Operation", Presented at 1993 Proeedings of the 43rd Electronic Components and Technology Conference, Orlando, Florida, USA, Electronic Components and Technology Conference, Jun. 1 to Jun. 3, 1993, Published by IEEE, IEEE Service Center, Piscataway, NJ, USA, 1993, pp. 431–435.

Terry R. Bloom, "The Reliability Of AlN Power Hybrids Using Cu Thick Film Conductive", 1990 Proceedings of the 40th Electronic Components and Technology Conference, (May 20, 1990) Las Vegas, NV, USA, Electronics Components Conference published by IEEE, 1990, pp. 111–115.

H. Mizuhara and E. Huebel, "Joining Ceramic to Metal with Ductile Active Filler Metal" Welding Journal, Oct. 1986, pp. 43–51.

H. Mizuhara, "Vacuum Brazing Ceramics to Metals", Advanced Materials & Processes, Inc. Metal Progress, Feb. 1987, pp. 53–55.

H. Mizuhara and K. Mally, "Ceramic–to–Metal Joining with Active Brazing Filler Metal", Welding Journal, Oct. 1985, pp. 27–32.

R. W. Harshbarger, W.K. Jones, W. Jiang, R. Zhug, "Evaluation Of Braze Processes For AlN Packages", The International Journal for Hybrid Microelectronics, vol. 14, No. 1, Mar. 1991, pp. 11–22.

N. Anderson, S. Weinshanker, "Brazing Of Aluminum Nitride", The International Journal For Hybrid Microelectronics, vol. 14, No. 4, Dec. 1991, pp. 121–128.

Y. Watabe, F. Matsumoro, S. Iwata and T. Ohno, "AlN Thick–Film Metallized Substrate", IMC 1992 Proceedings, Yokohama, Jun. 3–Jun. 5, 1992, pp. 349–354.

Lucas–Milhaupt, Inc., "Lucanex Brazing Pastes For Bonding, Joining or Coating of Ceramics and Other Hard to Wet Materials", Technical Data Sheet—Lucanex, (not dated) 6 pages.

M.G. Nichols, D.A. Mortimer, L.M. Joens, R.M. Crispin, "Some Observations on the Wetting and Bonding of Nitride Ceramics", Journal of Materials Science 25, (1990) pp. 2679–2689.

ASM Engineered Materials Handbood, "Ceramics and Glasses", vol. 4, 1991, pp. 504–510.

Masako Nakahashi, Makoto Shirokane and Hiromitsu Takeda, "Characterization of Nitride Ceramic–Metal Joints Brazed with Ti Containing Alloys", J. Japan Inst. Metals, vol. 53, No. 11, (1989), pp. 1153–1160 (untranslated).

WESGO Division, GTE Products Corporation, "High Purity Low Vapor Pressure Brazing Alloys", Wesgo GTE Technical Ceramics and Metals, (not dated) 12 pages.

W. Weise, W. Malikowski, and W. Böhm, "Active Brazing Alloys", Technical Library, Degussa Metz Metallurgical Corporation, West Germany, (not dated) 4 pages.

Geschäftsgegiet Löttechnik Anwendungstechnik, Degussa, "Brazing of Ceramics" (not dated) 32 pages.

Lucas–Milhaupt, Inc., "Handy Flow Brazing/Soldering Paste Alloys", Bulletin PA–Dec. 1989, 4 pages.

Lucas–Milhaupt, Inc., "Brazing/Soldering Filler Metals", Bulletin BA–188, (not dated), 4 pages.

"Fusion Ceramic Brazing with Fusion Paste Alloys", (not dated) 1 page.

*Primary Examiner*—Patrick Ryan
*Attorney, Agent, or Firm*—Fay, Sharpe, Beall, Fagan, Minnich & McKee

[57] ABSTRACT

Solder active braze compositions are disclosed which enable the formation of circuit traces having improved leach resistance during soldering operations so that it is not necessary to apply protective coatings onto the circuit traces. Additionally, the solder active braze compositions disclosed herein can be readily soldered to so that it is not necessary to separately apply a coating onto the circuit trace so that electrical connections can be made to the traces by soldering. Also disclosed are electronic assemblies comprising circuit traces formed from the particular solder active braze compositions, and methods of forming such electronic assemblies.

9 Claims, No Drawings

SOLDER ACTIVE BRAZE

FIELD OF THE INVENTION

The present invention relates to active braze compositions and methods for forming electrically conductive traces on substrates from such compositions. The compositions of the present invention do not require a protective coating, and can be readily wetted during soldering operations, such as when attaching electronic components to the conductive traces.

BACKGROUND OF THE INVENTION

In forming electronic assemblies, it is known to screen print an electrically conductive material on a suitable substrate and fire the resulting assembly. If electrical connections are to be made to the conductive pattern on the substrate by soldering, which is quite typical, it is necessary to provide a protective coating over the conductive pattern to prevent the underlying conductive material from being leached into the solder. This is particularly necessary when the conductive pattern is exposed to molten solder, typically at temperatures up to 260° C. for up to 2 minutes, as would occur in many conventional soldering practices. In addition, the protective coating serves to prevent or minimize oxidation of the conductive material, such as from exposure to air. Protective coatings are generally formed by plating a layer of nickel over the conductive pattern on the substrate. Although necessary to prevent leaching and oxidation of conductive material in deposited patterns or traces, protective coatings are undesirable due to the added expense of material and processing costs. Moreover, when nickel plating is utilized to form a protective coating, there are additional disadvantages associated with that practice such as environmental concerns over the processing of the nickel and potential for damage to other components of the electronic assembly from the plating operation. Thus, there is a need for a method of eliminating the requirement of providing protective coatings over conductive patterns, particularly those utilized in electronic assemblies.

Depending upon the material utilized for the protective coating, conditions for subsequent soldering to the conductive pattern, and composition of the solder material, it may be necessary to further deposit a solder-based composition over the protective coating so that electrical connections can be made to the electrically conductive pattern. This is particularly necessary when the protective coating is formed by nickel plating. It is undesirable to further deposit a solder-based composition over the protective coating in view of the added cost and manufacturing complexity. Thus, there is a need for a method of eliminating the requirement of applying solder-based materials to protective coatings on conductive traces.

SUMMARY OF THE INVENTION

The present invention achieves all of the foregoing objectives by providing solder active braze compositions and related methods for forming electrically conductive traces. The solder active braze compositions comprise particular amounts of titanium hydride, and particular amounts of lead, tin, silver, indium, copper, or combinations thereof. The present invention also provides electronic assemblies comprising conductive traces utilizing the particular solder active braze compositions, and related methods of forming.

DESCRIPTION OF THE PREFERRED EMBODIMENT

The compositions of the present invention are referred to herein as solder active braze materials. These solder active braze materials are utilized to form electrically conductive traces or patterns which do not require protective coatings or coatings to promote wetting during soldering operations. The particular combinations and proportions of components in the solder active braze compositions render the compositions much less susceptible to leaching during soldering operations involving temperatures up to 260° C., and oxidation from exposure to air. Moreover, the particular combinations and proportions of ingredients of the solder active braze materials described herein, enable electrical connections to be made to circuit traces formed from the solder active braze materials by soldering directly to the circuit traces.

The solder active braze material comprises a combination of active agents and base metals in particular proportions. The solder active braze compositions according to the preferred embodiment comprise from about 1% to about 15% of one or more active agents, and from about 85% to about 99% of one or more base metals (all percentages expressed herein are on a weight basis based upon the total weight of the active agent(s) and base metal(s)). The active agent for use in the solder active braze compositions may be any active agent as is known in the art. The preferred active agents for use in the compositions described herein are selected from the group consisting of titanium, hafnium, zirconium, corresponding hydrides, and combinations thereof. The most preferred active agent is titanium hydride. The base metals for use in the solder active braze compositions are selected from the group consisting of lead, tin, silver, indium, copper, and combinations thereof.

The present inventor has discovered several particularly preferred solder active braze compositions. These preferred compositions are: (a) about 1% to about 15% titanium hydride and about 85% to about 99% lead; (b) about 5% to about 10% titanium hydride, about 33% to about 38% lead, and about 58% tin; (c) about 5% to about 10% titanium hydride and about 90% to about 95% tin; (d) about 5% to about 10% titanium hydride, about 57% to about 85% lead, and about 5% to about 38% indium; (e) about 5% to about 10% titanium hydride, about 32% to about 34% tin, about 56% to about 59% silver, and about 2% indium; (f) about 10% titanium hydride, about 55% tin, and about 35% indium; (g) about 10% titanium hydride, about 20% tin, about 40% silver, about 10% indium, and about 20% copper; (h) about 10% titanium hydride, about 89% lead, and about 1% copper; and (i) about 10% titanium hydride, about 88% lead, about 1% tin, and about 1% copper. The most preferred solder active braze compositions are a composition comprising about 5% titanium hydride, about 37% lead, and about 58% tin; and a composition comprising about 5% titanium hydride and about 95% lead.

The solder active braze compositions described herein may further comprise one or more optional ingredients. One example of an optional ingredient that may be utilized in the solder active braze compositions described herein is an organic vehicle. Such vehicle may be any common organic screen printing vehicle known in the art, however, the vehicle selected should be an "inert firing vehicle." That is, when the solder active braze composition is fired, the organic vehicle should leave minimal carbon residue. A wide array of organic vehicles may be utilized in the compositions described herein. One class of suitable vehicle materials are nitrogen firable screening agents known to those in the art. Representative examples of such screening agents include compositions comprising a polymeric component selected for the products resulting from its decomposition, one or more solvents, and optionally, one or more surfactants or wetting agents. An example of a suitable vehicle for use in the solder active braze compositions described herein, comprises about 9% ELVACITE 2045, an acrylic, available from Du Pont; about 77% pine oil available from Hercules Yarmore under the designation No. 302; and about 14% of a wetting agent available from GAF Chemicals under the designation IGEPAL CO-430 surfactant.

Additional optional components that may be incorporated into the preferred brazing compositions described herein include those set forth in U.S. Pat. Nos. 4,835,344; 4,924,033; and 5,019,187 all to Iyogi et al., which are all incorporated herein by reference.

In forming the solder active braze compositions described herein, it is preferred to utilize reagent grade base metals and active agents in a fine powdered form, that is having a particle diameter less than from about 1 micron to about 50 microns. It is preferred to utilize relatively small particles of the active agent to promote dispersion of the agent throughout the solder active braze composition. The solder active braze compositions are formed by combining the powdered metals and active agents with the organic vehicle and mixing until a pasty consistency is obtained. In some instances it may be preferable to subject the resulting solder active braze composition to further grinding or other processing operations.

Electrically conductive patterns may be formed by depositing the solder active braze materials of the present invention upon a wide array of substrate materials. The substrate material may be any suitable material that can withstand the processing conditions. The substrate may be formed from a variety of materials including, but not limited to, ceramic materials, and other insulative materials. In the event a ceramic substrate is utilized, it is preferred to employ an $Al_2O_3$ ceramic. The substrate may even be formed from electrically conductive materials so long as an insulative layer is disposed between the conductive material of the substrate and the circuits or other electrical contacts disposed thereon.

The solder active braze composition may be deposited in a variety of fashions, including but not limited to, screen printing and notching. The term "notching" as used herein refers to a process whereby a printing head, typically having a plurality of thin printing members or fingers, is dipped or otherwise contacted with the solder active braze composition. The composition adheres to the printing members extending from the printing head. The printing members or fingers are then contacted with the substrate or electronic component whereby at least a portion of the solder active braze material is transferred from the printing members to the substrate or electronic component. Typically, the layer of solder active braze material deposited on a substrate is about 3 mils thick. The resulting assembly is then heated or fired to a temperature above the melting point of the solder active braze material.

Firing is performed in a substantially oxygen-free environment such as argon, nitrogen or high vacuum. A preferred firing environment is argon with an impurity or oxygen level of less than about 4 ppm. Argon is generally preferred as it effectively functions as a wash gas for the assembly being fired and does not react with the active components. It is most preferred to place the substrate and other components to be fired on a molybdenum "setter" or fixture covered with a titanium lid. Although not wishing to be bound to any particular theory, it is believed that the molybdenum setter and titanium cover act as oxygen collectors and minimize adverse reaction between oxygen impurities in the argon environment and the solder active braze composition. An example of a suitable furnace for firing is an Astro Model ATF-0716 MM atmosphere furnace.

Depending upon the solder active braze composition utilized, the firing temperature will vary. The preferred temperatures for the compositions described herein range from about 550° C. to about 850° C. The most preferred firing temperature is about 625° C.

The compositions of the present invention are of significant commercial importance particularly for forming electronic circuits by depositing an electrically conductive material onto a substrate. The compositions have been found to eliminate the prior art requirement of nickel plating or otherwise forming a protective coating on the circuit trace, followed by further depositing a solder-based material on the previously deposited protective coating to ensure that electrical connections can be made to the circuit trace.

Once the solder active braze has been fired upon a substrate, the resulting assembly may be exposed to standard solder compositions for many hours with no loss of adhesion between the active braze and the substrate. The surface of the solder active braze deposit will remain wet by the solder and will remain coated with fresh solder upon removal from the solder pot. This is remarkable, and eliminates the prior art necessity of having to deposit a material onto the conductor trace or pattern to promote wetting during subsequent operations.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the Doctrine of Equivalents.

The embodiments of the invention in which an exclusive property or privilege is claimed are defined as follows:

1. A solder active braze composition selected from the group consisting of:
   (a) a composition consisting essentially of about 1% to about 15% titanium hydride and about 85% to about 99% lead;
   (b) a composition consisting essentially of about 5% to about 10% titanium hydride, about 33% to about 38% lead, and about 58% tin;
   (c) a composition consisting essentially of about 5% to about 10% titanium hydride and about 90% to about 95% tin;
   (d) a composition consisting essentially of about 5% to about 10% titanium hydride, about 57% to about 85% lead, and about 5% to about 38% indium;
   (e) a composition consisting essentially of about 5% to about 10% titanium hydride, about 32% to about 34% tin, about 56% to about 59% silver, and about 2% indium;
   (f) a composition consisting essentially of about 10% titanium hydride, about 55% tin, and about 35% indium;
   (g) a composition consisting essentially of about 10% titanium hydride, about 20% tin, about 40% silver, about 10% indium, and about 20% copper;
   (h) a composition consisting essentially of about 10% titanium hydride, about 89% lead, and about 1% copper; and
   (i) a composition consisting essentially of about 10% titanium hydride, about 88% lead, about 1% tin, and about 1% copper.

2. The composition of claim 1 wherein said composition consists essentially of about 5% titanium hydride, about 37% lead, and about 58% tin.

3. An electronic assembly comprising:
a substrate;
a layer of a solder active braze material disposed on said substrate wherein said solder active braze material is selected from the group consisting of:
(a) a material comprising about 1% to about 15% titanium hydride and about 85% to about 99% lead;
(b) a material comprising about 5% to about 10% titanium hydride, about 33% to about 38% lead, and about 58% tin;
(c) a material comprising about 5% to about 10% titanium hydride and about 90% to about 95% tin;
(d) a material comprising about 5% to about 10% titanium hydride, about 57% to about 85% lead, and about 5% to about 38% indium;
(e) a material comprising about 5% to about 10% titanium hydride, about 32% to about 34% tin, about 56% to about 59% silver, and about 2% indium;
(f) a material comprising about 10% titanium hydride, about 55% tin, and about 35% indium;
(g) a material comprising about 10% titanium hydride, about 20% tin, about 40% silver, about 10% indium, and about 20% copper;
(h) a material comprising about 10% titanium hydride, about 89% lead, and about 1% copper; and
(i) a material comprising about 10% titanium hydride, about 88% lead, about 1% tin, and about 1% copper.

4. The assembly of claim 3 wherein said solder active braze material consists essentially of about 5% titanium hydride, about 37% lead, and about 58% tin.

5. An electronic assembly formed by a process comprising:
providing a composition including about 5% to about 10% titanium hydride, about 33% to about 38% lead, and about 58% tin;
depositing said composition on a substrate; and
firing said composition disposed on said substrate at a temperature from about 550° C. to about 850° C.

6. The electronic assembly of claim 5 wherein said firing is performed in an argon atmosphere.

7. The electronic assembly of claim 5 wherein said firing is performed at a temperature of about 625° C.

8. The electronic assembly of claim 5 wherein said composition consists essentially of about 5% titanium hydride, about 35% lead, and about 58% tin.

9. The electronic assembly of claim 8 wherein said firing is performed at a temperature of about 625° C. and performed in an argon atmosphere.

* * * * *